FIG. 2.

Nov. 21, 1950     J. R. MARTIN     2,530,976
METHOD OF CHILLING MIXTURES
Filed Sept. 12, 1947     5 Sheets-Sheet 5

FIG. 5.

John R. Martin, INVENTOR.
BY
J. G. McKean
ATTORNEY.

Patented Nov. 21, 1950

2,530,976

UNITED STATES PATENT OFFICE 2,530,976

METHOD OF CHILLING MIXTURES

John R. Martin, Baytown, Tex., assignor, by mesne assignments, to Standard Oil Development Company, Elizabeth, N. J., a corporation of Delaware Application September 12, 1947, Serial No. 773,667

3 Claims. (Cl. 62—170)

This invention relates to a method of chilling liquid mixtures. More particularly it relates to an improved method of controlling the cycle operation of a plurality of chilling zones when liquid mixtures are undergoing chilling.

In order to remove crystallizable materials from a liquid mixture containing same, the mixture is frequently mixed with a volatile diluent to form a homogeneous mixture, and the total mixture is then subjected to a chilling operation by evaporating a portion of the diluent therefrom. After the mixture has been chilled to a sufficiently low temperature to cause crystal formation and phase separation, the crystals are separated from the liquid phase by filtration or other means. This chilling procedure is particularly suitable for effecting the crystallization of waxy materials contained in certain types of mineral oils. For example, a mineral oil containing hydrocarbons having lubricant properties may be mixed with a diluent such as propane in liquefied form, charged to a chilling zone under super-atmospheric pressure, chilled by evaporating the propane therefrom to cause wax constituents to crystallize, and filtered to separate the crystalline materials from the liquid phase. After removing diluent from the filtered liquid, a lubricating oil is obtained having improved low temperature flow characteristics.

Such chilling operations are frequently carried out in a plurality of zones operated in cycles; that is, while one zone contains liquid undergoing chilling, another zone is emptied of a charge of chilled mixture and is refilled with a fresh portion of mixture for chilling. This procedure permits an almost continuous production of chilled solution for charging to a filtration operation. On the other hand, the cycle chilling process is not easily adapted to automatic control of the various operations. In the case of catalytic cracking, dehydrogenation and hydroforming processes carried out in reactors undergoing cycle operation, definite time intervals may be used for controlling the reaction, purging and regeneration steps in one zone in relation to the sequence of operations in another zone. Such is not the case in a chilling operation. For example, the chilling equipment must be adapted for handling a wide variety of wax-containing oils, each oil having different chilling characteristics. The amount of diluent required, the rate at which the temperature may be lowered, and the susceptibility of the oil to "shock chilling" may be different for each oil; hence, it is not possible to set a definite time interval for each step of the chilling cycle. Even for any one oil, definite time intervals cannot always be set for each step because of equipment limitations. As a rule, a series of compressors is employed to liquefy the gaseous diluent evaporated from the chilling mixture. Thus, if any of the compressors become incapacitated during the cooling step, the rate at which the diluent can be evaporated is changed. The chilling operation must also be carefully integrated with the filtering operation to insure the proper supply of charge to the latter step at all times. Any changes in the capacity of the filters during the dewaxing of any one oil will also necessitate changing the chilling operation rate.

Conventional chilling operations are, therefore, usually controlled manually. In such operations, each step in the chilling cycle must be regulated by manual manipulation of the valves involved, and, under certain variable conditions, changes in the operation must be anticipated before and after the completed cycle to an extent to cause variations in the time of any one step from cycle to cycle. In many cases such variations would be eliminated by proper control of one step in a particular sequence of operations with respect to another step in another sequence of operations, each sequence being carried out in one of a plurality of chilling zones. Although complete automatic control of a chilling process is usually not possible for the reasons discussed above, a control method having sufficient flexibility to be compatible with changes arising from differences in charge stock and equipment limitations and, at the same time, insuring the most favorable chilling conditions possible under the circumstances would certainly result in economies not heretofore realized. I have now found a method of realizing such control of the sequence of steps required for chilling liquids in a plurality of zones undergoing cycle operation.

It is, therefore, the main object of my invention to provide an improved method for chilling liquid mixtures by evaporating a volatile diluent therefrom.

It is another object of my invention to provide suitable control means such that substantially automatic control is obtained when chilling mixtures in a plurality of zones undergoing cycle operation.

It is a further object of my invention to utilize the changes occurring in one particular step of a chilling cycle to control the operation of other steps in another chilling cycle when use is made of a plurality of chilling zones.

Other objects will become apparent in the following description of my invention and in the appended claims.

In a conventional dewaxing process, the sequence of steps employed to effect chilling of the oil comprises mixing the oil with diluent under temperature and pressure conditions to maintain the mixture in the liquid state, charging the mixture to a chilling zone, evaporating diluent from the mixture to cool it while at the same time adding liquid diluent back to the mixture to maintain a substantially constant concentration of oil in diluent during the chilling step, charging evaporated diluent to a precompression zone on the suction side of a compression zone, and eventually charging the chilled mixture to an accumulation zone from which it may be charged to a filtration zone at a constant rate. After discharging the chilled mixture from the chilling zone, a fresh charge may be added thereto, or, if the oil contains waxy materials which upon shock chilling form crystals difficult to filter, the chilling zone may be heated by adding thereto warm gaseous diluent prior to the charge of fresh mixture. Any number of chilling zones may be employed in cycle operation.

In the practice of my invention, the various portions of the chilling equipment may be provided with liquid level, temperature, pressure, and flow rate control instruments. Each instrument is provided with suitable mechanical devices such that it will function within a desired range of operating conditions. The mechanical devices may be manually controlled turn knobs which will re-position a control index within measurable limits of the instrument and an automatic control mechanism will in turn function in the range of conditions set on the control index. The control instruments on one chilling zone and its related equipment will then function in response to changes occurring in the chilling operation in another chilling zone and its related equipment. It is also to be understood that some or all of the changes may be made manually, if desired.

For example, for two chilling zones operating in cycles with the first zone empty and ready to receive a charge of mixed diluent and oil and the second zone having liquid charge which is being chilled to some predetermined, ultimate, low temperature, a liquid level control in the first zone may receive its impulse to operate from a temperature control in the second zone when the liquid in the second zone has reached a first temperature level which is at some predetermined point above the ultimate low temperature. The liquid level control will discontinue the liquid charge to the first zone when the desired level has been reached. When the ultimate low temperature has been reached in the second zone, its temperature controller will, first, impulse a flow rate controller to transfer the flow of liquid diluent from the second zone to the first zone, second, impulse a pressure controller on the vapor discharge of the first zone to operate causing diluent to be evaporated at a controlled rate from the liquid to a precompression zone; and, third, impulse the liquid level control in the second zone to cause the discharge of chilled mixture from this zone to an accumulation zone. A pressure control on the accumulation zone will impulse to close the vapor and discharge valves on the second chilling zone and also will impulse a pressure controller on the second zone to control the flow of warm gaseous diluent to this zone for the warming operation. When the second zone has reached a desired high temperature, its pressure controller will stop the flow of warm, gaseous diluent thereto. The temperature controller on the first zone will, when its charge has reached a first, low temperature level, impulse the liquid level controller on the second zone to operate and charge the desired amount of fresh charge to this zone. The above sequence of operations is then repeated on the opposite chiller.

In the usual case, the temperature controllers on the chilling zones are provided with variable index sets since the temperature to which the charge must be chilled will vary for each different stock. Since the foaming characteristics of the various charge stocks and the oil to diluent ratios in the charge stocks are criteria used to determine the operable pressure on the suction side of the compressors, and since these factors vary for different stocks, the pressure controller at this point should also have a variable index set. The flow rate controller for charging liquid diluent to the chilling zones and the liquid level and pressure controllers in the chilling zones will also have variable index set points.

One of the most critical operations in the chilling cycle is that of evaporating the diluent from the mixture during the chilling operation. The charge introduced into the chilling zone is at a very high pressure and must be evaporated into the suction side of a compression zone at a very low pressure. The diluent must be slowly evaporated during the initial chilling operation to prevent the mixture from foaming and causing oil to be carried to the low pressure zone. This is prevented by throttling the release valve on the vapor discharge line from the chilling zone until the mixture has been chilled sufficiently to cause its pressure to be reduced. The discharge valve is conventionally manually manipulated depending on the sound of the throttling action and on the pressure on the suction side of the compressors. Such control is obviously inefficient and a very important feature of my invention is that of automatically initiating and controlling the throttling operation in response to changes of temperature and pressure or flow rate in various parts of the system.

I will now describe in more detail one method of carrying out my improved control procedure in connection with the drawings in which.

In the following discussions, it will be assumed that chilling zone A is empty and is ready to receive a charge of warm mixture of diluent and liquid containing crystallizable material and that chilling zone B contains mixture which is being chilled by evaporation of diluent therefrom. The numerals designating valves, instruments, connections or other equipment identical in both chilling zones are suffixed by the letter A or B depending on the chilling zone of which they comprise a component part.

Figure 1:
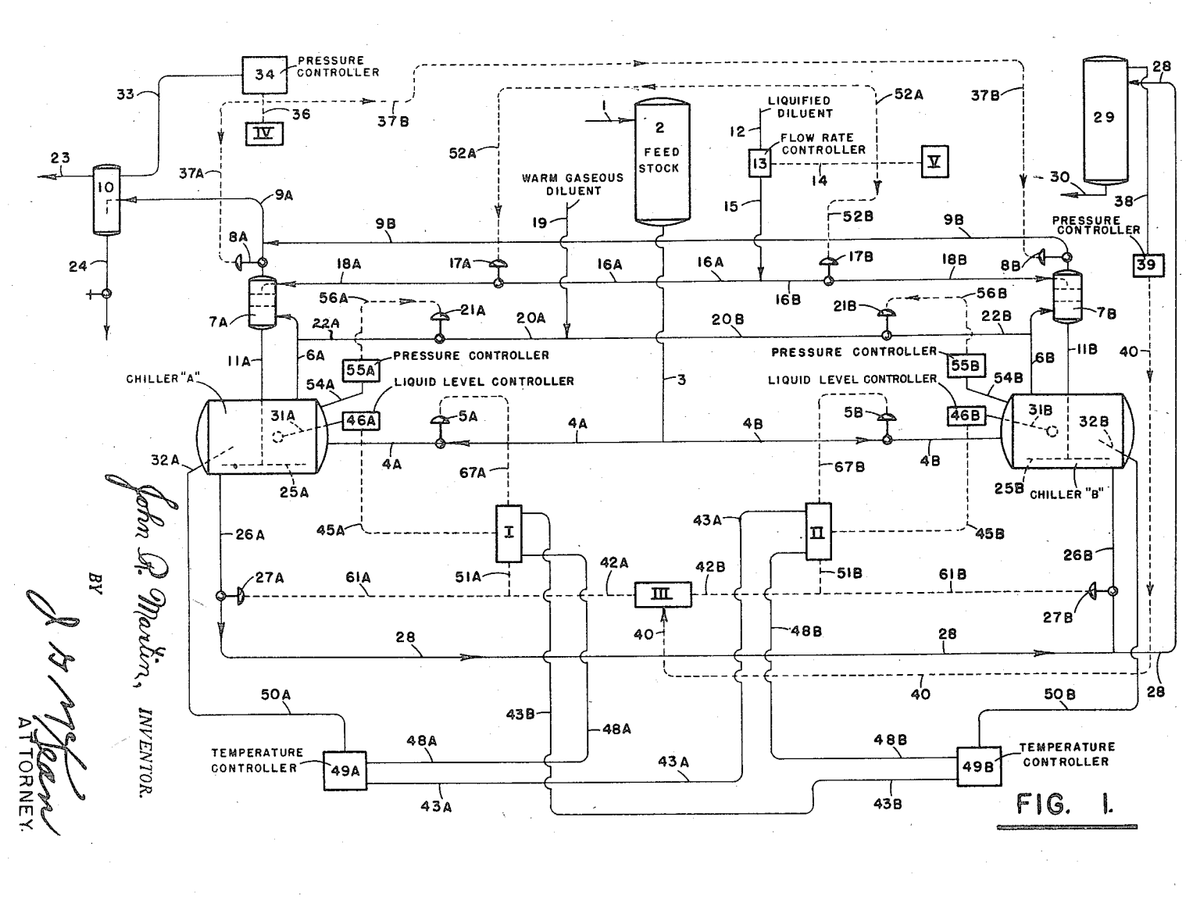
Fig. 1 shows a flow diagram of two chilling zones, designated by the letters A and B, which operate in cycles of a sequence of steps for chilling a mixture of oil and diluent.

Turning now to Fig. 1, the flow through chiller A will be discussed. A warm mixture of diluent and liquid to be chilled is charged to tank 2 through line 1. This mixture is under relatively high pressure which is higher than the pressure in empty chilling zone A. By opening valve 5A, the difference in pressure in tank 2 and zone A causes mixture to flow through lines 3 and 4A to the latter zone. When the liquid level in zone A is at a desired height, valve 5A is closed and valves 8A and 17A are opened. Vapor discharge valve 8A is throttled to cause diluent to evaporate from liquid in high pressure zone A and pass through line 6A, contacting means 7A containing several bubble cap plates, and line 9A to a precompression zone such as trap 10. This trap is equipped with line 23 leading to the suction side of compression means not shown and line 24 for discharging liquid entering the trap. Valve 17A is opened to charge cold, liquid diluent from lines 15 and 16A through line 18A into contactor 7A at a point above the bubble cap plates. The cold diluent flowing downwardly through contactor 7A is countercurrently contacted with the evaporated diluent flowing upwardly therethrough, and the temperature of the cold liquid diluent is thus brought to the approximate temperature of the evaporated diluent. The liquid diluent then passes through line 11A and distributor 25A to mix with the charge being chilled in zone A. The liquid diluent is added to zone A during the chilling operation to compensate for the diluent evaporated from the mixture.

When the charge in chilling zone A has reached its ultimate low temperature level, valve 17A is closed and valve 27A is opened such that the chilled mixture may be discharged through lines 26A and 28 to accumulation zone 29. The chilled mixture in this latter zone may be discharged as desired through line 30 to a separation means such as a filter not shown. It is mentioned that the discharging operation from chilling zone A is effected by maintaining this zone in fluid connection with zone B which contains solution under high pressure. When the liquid level in zone A has reached a low level, valve 27A is closed momentarily to allow the sides of the chiller to drain and then valve 27A is reopened to permit complete discharge of the chiller. Valves 27A and 8A are then closed and valve 21A is opened to introduce warm gaseous diluent through lines 19, 20A, 22A, and 6A into zone A. This operation heats the chiller to a temperature sufficiently high to prevent the harmful effects of "shock" chilling when charging fresh solution to the chilling zone. Valve 21A is eventually closed and valve 5A is opened to charge another portion of solution to the chiller and the chilling cycle is repeated. The sequence of operations discussed above for chiller A is identical for chiller B.

Figure 2:
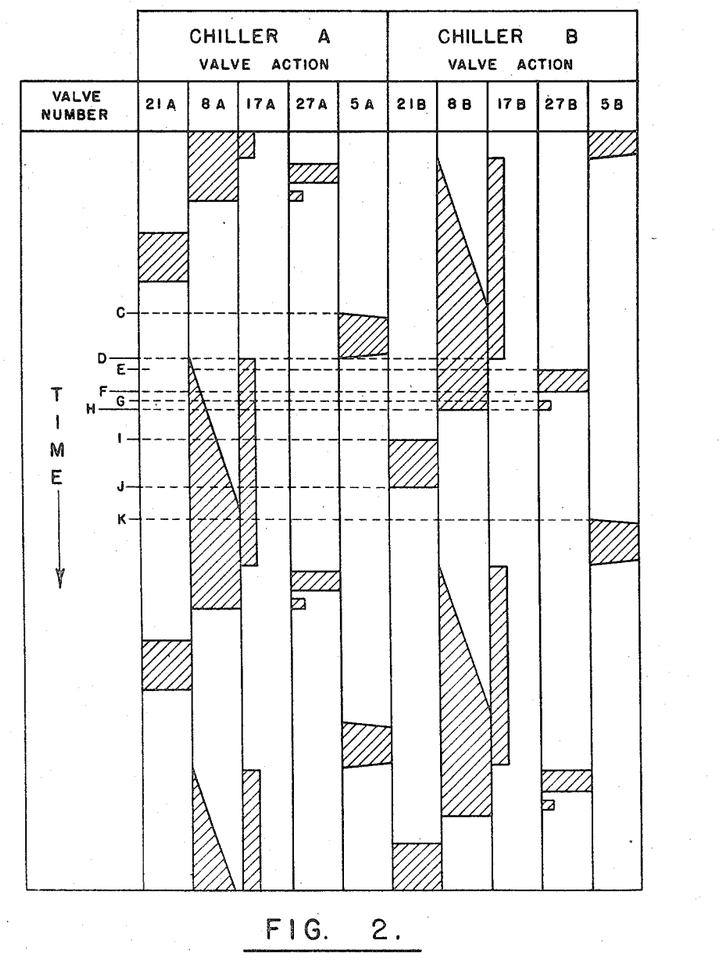
Fig. 2 shows diagrammatically the valve action required to accomplish the various sequences of operations in the two chilling zones operating in cycles.

The sequence of valve manipulations employed to chill a mixture of diluent and oil when operating chillers A and B in cycles is shown diagrammatically in Fig. 2. The ordinate shows the valve action for the two chillers and the abscissa shows the relative lengths of times that the valves relating to each chiller are open. The shaded portions of the figure represent the period during which any particular valve is open. Point C on the abscissa represents the point in the operation in which chiller A is empty while chiller B contains solution being chilled. Valves 17B and 8B are open, and the temperature of the solution in chiller B has reached a first low level which is at some point above the desired second low, or ultimate, temperature level to which the solution is being chilled. Valve 5A is opened and solution is charged to chiller A. It is desired that chiller A be filled to a desired level when chiller B is at the second low temperature level represented by the point D. At this point chiller A will be at its maximum pressure. Valves 5A and 17B are closed and valves 8A and 17A are opened. The flow of cold, liquid diluent is thus transferred from chiller B to chiller A and diluent is evaporated from the mixture in chiller A. Since both valves 8A and 8B are open at this point, chillers A and B are in fluid communication with one another. The throttling action on valve 8A is represented by the upward slope of the shaded area in the figure.

Valve 27B is opened as shown at point E and the pressure in chiller A causes the discharge of chilled solution from chiller B. When the liquid level in the latter chiller has reached some predetermined low value, valve 27B is closed at point F to allow drainage and reopened at G until the chiller is empty. This valve is then closed at point H. Simultaneously, valve 8B is closed. Valve 21B is then opened at point I to introduce warm gaseous diluent into chiller B and is closed at point J when the chiller is heated to a desired temperature. When the solution in chiller A has reached a first temperature level at point K, valve 5B is opened and the chilling cycle is repeated on chiller B. Point K for chiller B is identical to point C for chiller A. The total time for a complete cycle on one chiller (from point C to point K) may be about one-half hour or may be a shorter or longer period, depending on the material being chilled.

Returning to Fig. 1, the instruments employed for controlling the various operations will now be described.

The chilling zones A and B are provided with temperature sensitive elements 32A and 32B which connect through leads 50A and 50B to temperature controllers 49A and 49B. The chillers also have connected thereto liquid level controllers 46A and 46B having liquid level sensitive elements 31A and 31B, and pressure controllers 55A and 55B having pressure sensitive elements 54A and 54B. Trap 10 is provided with pressure controller 34 and pressure sensitive element 33. Line 12 through which cold diluent is introduced into the system is provided with flow rate controller 13.

Temperature controllers 49A and 49B are connected through electrical leads 48A and 43B, respectively, to relay device I and through leads 43A and 48B, respectively, to relay device II. Level controllers 46A and 46B are connected through air lines 45A and 45B to relay devices I and II, respectively, and these devices connect through air lines 67A and 67B to valves 5A and 5B, respectively. These relay devices also connect through air lines 51A and 61A to valve 27A and through lines 51B and 61B to valve 27B, respectively. Pressure controller 39 connects through air line 40 to relay device III which in turn connects to valves 27A and 27B through lines 42A and 61A and lines 42B and 61B, respectively.

Pressure controller 34 connects to relay device IV through line 36 and to valves 8A and 8B through lines 37A and 37B, respectively. Flow rate controller 13 connects through line 14 to relay device V and to valve 17A and 17B through lines 52A and 52B, respectively; pressure controllers 55A and 55B connect with valves 21A and 21B through lines 56A and 56B, respectively. The controllers are interconnected through other leads and lines not shown which will be described in connection with Figs. 3, 4, and 5. The pressure, liquid-level and flow rate controllers discussed herein will be conventional pneumatic types although electrical controllers are applicable. The temperature controllers may be of the electrical type. This latter instrument may be provided with two mechanical indexes with variable control points which may be manually positioned to relay impulses when the chilling temperature in the chilling zone has reached a first and a second low temperature level, respectively. The other controllers may also have mechanical devices such as manually controlled turn knobs which will re-position control indexes within the measurable limits of the instrument and automatic control mechanisms which will function around the control index. Such control indexes are conventional to instruments commercially available and will not be described in detail.

The valves shown on Fig. 1 may be conventional pneumatic positioned hydraulically-operated valves with by-pass valves in the hydraulic control system. All valves may be actuated by snap action control with the exception of throttling valves 8A and 8B which may be arranged to allow gradual opening of the hydraulic valve during the throttling step. Valves 8A and 8B may be air close valves; that is, high air pressure on the valve diaphragms will cause them to be completely closed, whereas zero air pressure will cause them to open completely. Thus, pressure controller 34 may have its index set positioned such that high air pressure may feed to the valve diaphragm of valve 8A in the initial throttling action, and the air pressure will gradually decrease to open the valve more and more as the chilling operation proceeds. The extent to which controller 34 feeds control air of successively lower pressure to the valve is a function of the pressure in trap 10. The pneumatic valve superstructure on valves 8A and 8B may operate a self-positioning pilot valve hydraulically operated. The inlet for introducing hydraulic oil into the valve opening port of the hydraulic oil cylinder may have a restriction of such size in the line that oil introduced into the cylinder will enter slowly and bleed out at a normal rate. This restriction will present the valve from opening too much before pressure control 34 can start its function. Other valves may be of the air open type requiring air pressure to actuate the diaphragms and open the valve. Such description of the valves and their operation are well known to the art.

Figure 3:
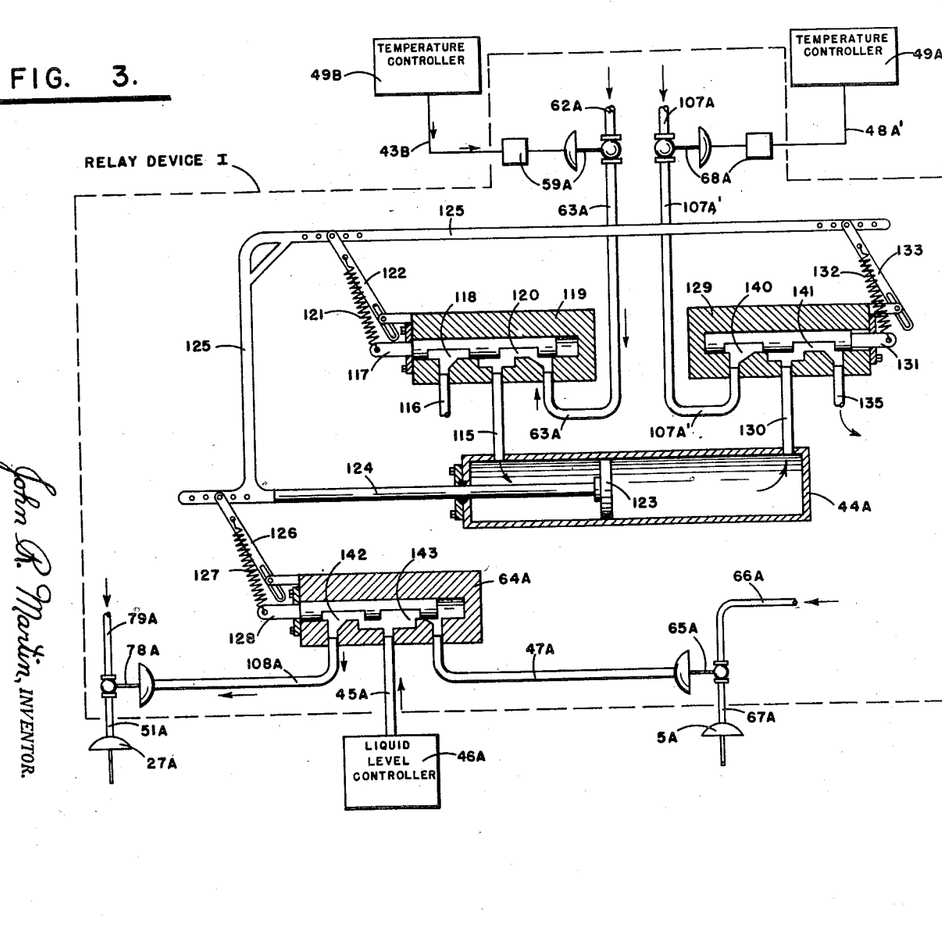
Figs. 3 and 4 show in detail two types of relay devices through which an impulse from one instrument may be relayed to actuate the operation of another instrument; and, Fig. 5 shows in detail the instrumentation required to effect the sequency cycle control.

Turning now to Fig. 3, the function of relay device I, employed to relay a signal from one portion of the chilling cycle to another portion of the chilling cycle to cause the valve controllers to operate, will now be described. Fundamentally, all of the relay devices, I through V, are the same, with minor exceptions. The relay device described in Fig. 3, in the dotted portion of the figure, controls the action of valves 5A and 27A. Temperature controller 49B has an electrical connection 43B leading to solenoid unit 59A connecting lines 62A and 63A. Line 62A, connected to a source of air pressure, not shown, and line 63A, lead to conventional pilot valve 119. Valve 119 is connected to cylinder 44A through line 115. The pilot valve also has an opening to the atmosphere through line 116 and contains plunger 117 having an exhaust port 118 and an inlet port 120.

Temperature controller 49A is electrically connected to solenoid valve unit 68A through lead 48A'; valve 68A connects line 107A, having a source of air pressure, not shown, and line 107A' which latter line leads to pilot valve 129. Pilot valve 129 likewise contains a plunger 131 having an inlet port 140 and exhaust port 141. Line 130 leads from this pilot valve to the right side of cylinder 44A and line 135 leads to the atmosphere.

Cylinder 44A contains movable piston 123 connected to shaft 124. Shaft 124 has rigidly connected to it member 125. Member 125 has toggle switches 122 and 133 connected to pilot valves 119 and 129, respectively, each toggle switch containing springs 121 and 132 connected to plungers 117 and 131, respectively. Shaft 124 connected to piston 123 is also attached through toggle switch 126 to pilot valve 64A. Pilot valve 64A contains plunger 128 with ports 142 and 143, the plunger being connected to toggle switch 126 through spring 127. Pilot valve 64A also is connected to line 45A through which air pressure is received from liquid level control 46A. Line 108A leads from one side of the pilot valve 64A to pneumatic valve 78A, this latter valve connecting line 79A having a source of air pressure and line 51A leading to valve 27A. Line 47A leads from pilot valve 64A to pneumatic valve 65A connecting line 66A which has a source of air pressure and line 67A leading to valve 5A.

The operation of the relay device proceeds as follows: Assuming that temperature controller 49B sends out an electric impulse when the solution being chilled in chiller B has reached a first low temperature level, solenoid valve 59A will respond to the signal and open permitting air under pressure coming from line 62A to pass into pilot valve 119 through inlet port 120 and into the left side of cylinder 44A. In this particular illustration, plunger 117 is at its extreme left position and outlet port 118 is closed such that the air passing into line 115 cannot escape to the atmosphere through line 116. Air under pressure entering the left side of cylinder 44A causes piston 123 to move to the right and in so doing, rigid member 125 also moves to the right until a position is reached at which toggle switch 122 snaps plunger 117 to its extreme right position. Immediately inlet port 120 closes line 115 from line 63A and stops the flow of air into cylinder 44A. This movement opens outlet port 118 such that air under pressure in the left side of cylinder 44A flows through line 115 and line 116 to the atmosphere.

At the same time that toggle switch 122 snaps plunger 117 to the right, plungers 131 and 128 in pilot valves 129 and 64A, respectively, are likewise snapped to the right by their respective toggle switches. This movement accomplishes two purposes. Inlet port 140 in pilot valve 129 is positioned such that line 107A' is open to line 130 such that air under pressure may be received in the right side of cylinder 44A in a subsequent operation. In pilot valve 64A, the movement of plunger 128 to the right positions port 143 such that line 45A leading from controller 46A is open to line 47A. Immediately control air from controller 46A causes the opening of valve 65A which in turn permits air under pressure coming from line 66A to pass through line 67A actuating the diaphragm on valve 5A and causes this latter valve to open. The opening of valve 5A permits fresh charge to flow to chiller A at a rate depending on the pressure of fresh charge in feed stock tank 2 (Fig. 1). It will also be seen that the movement of plunger 128 to the right positions port 142 such that line 108A is closed off from line 45A preventing control air from liquid level controller 46A from opening valve 78A and opening valve 27A during the period that chiller A is being charged with fresh solution.

When the level of fresh solution in chiller A has reached a desired point, an index set in liquid level control 46A will operate such that control air is discontinued. This removes pressure from the diaphragm of valve 65A causing this valve to close which in turn shuts off the flow of air through line 66A and causes valve 5A to close.

In a subsequent operation when the liquid mixture in chiller A has been chilled to its ultimate low temperature, an electric impulse will be sent from temperature controller 49A through line 48A' to solenoid valve unit 68A. The opening of this latter valve permits air under pressure to flow through lines 107A and 107A' to the right side of cylinder 44A, inlet port 140 in pilot valve 129 having been positioned in the previously described operation in order to permit the air to travel into cylinder 44A. Piston 123 is moved to the left by this air pressure until a position is reached at which all of the toggle switches cause their respective plungers in the various pilot valves to snap to the left in the positions as shown in Fig. 3. Line 107A' is closed from line 130 and outlet port 141 in plunger 131 is positioned so as to permit air in the right side of cylinder 44A to flow to the atmosphere through line 135. Port 120 in plunger 117 is positioned such that air may be received from line 63A to the left side of cylinder 44A in a subsequent operation. Port 142 in plunger 128 is positioned such that control air from liquid level controller 46A may pass into line 108A and actuate the pneumatic diaphragm on valve 78A. When valve 78A is open, air under pressure passes through line 78A into line 51A and actuates the opening of valve 27A which permits chilled solution to flow from chiller A into accumulation zone 29 (Fig. 1).

Figure 4:
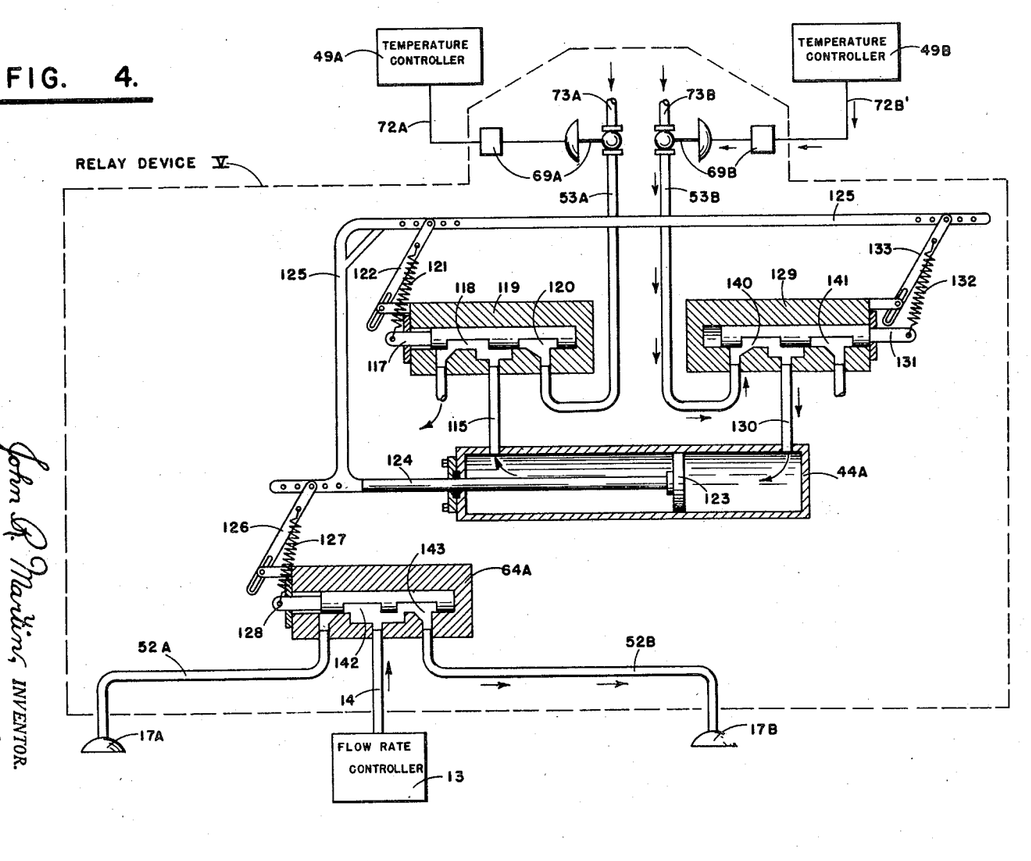

Turning now to Fig. 4, relay device V is shown in the dotted portion of the figure. This relay device is identical in almost all respects to that previously described in connection with Fig. 3, and the few minor differences will be described in connection with the operation of the device.

In this device, temperature controller 49A is electrically connected through line 72A to solenoid valve 69A and temperature controller 49B is electrically connected through line 72B' to solenoid valve unit 69B. For the sake of brevity, the numbers indicating the various portions of the pilot valves and the piston and cylinder arrangements are the same as shown in Fig. 3. In this case, when the ultimate low temperature has been reached in the liquid being chilled in chiller B, and electric impulse is sent from temperature controller 49B through line 72B' actuating solenoid valve 69B. Air under pressure passes from line 73B into the right side of cylinder 44A, port 140 in plunger 131 being positioned to permit this operation. The leftward movement of piston 123 causes the various plungers in the pilot valves to snap to the left. Control air from flow rate controller 13 thence passes from line 14 into line 52B which leads directly to valve 17B causing this valve to close. The movement of plunger 128 to the left also cuts off the flow of control air to valve 17A which causes this valve to open. This action causes the transfer of the flow of liquefied diluent from chiller B to chiller A. In a subsequent operation, in which the temperature of mixture in chiller A has reached an ultimate low temperature level, the proper signal will be sent to valve 69A which in turn causes air pressure to move piston 123 to the right. This causes the flow of cold liquid diluent to be transferred from chiller A to chiller B.

It is pointed out that the relay device I described in connection with Fig. 3 may be of the type employed for relay device II while the principle employed in connection with relay device V described in Fig. 4 may be the same as that employed for relay devices III and VI.

Figure 5:
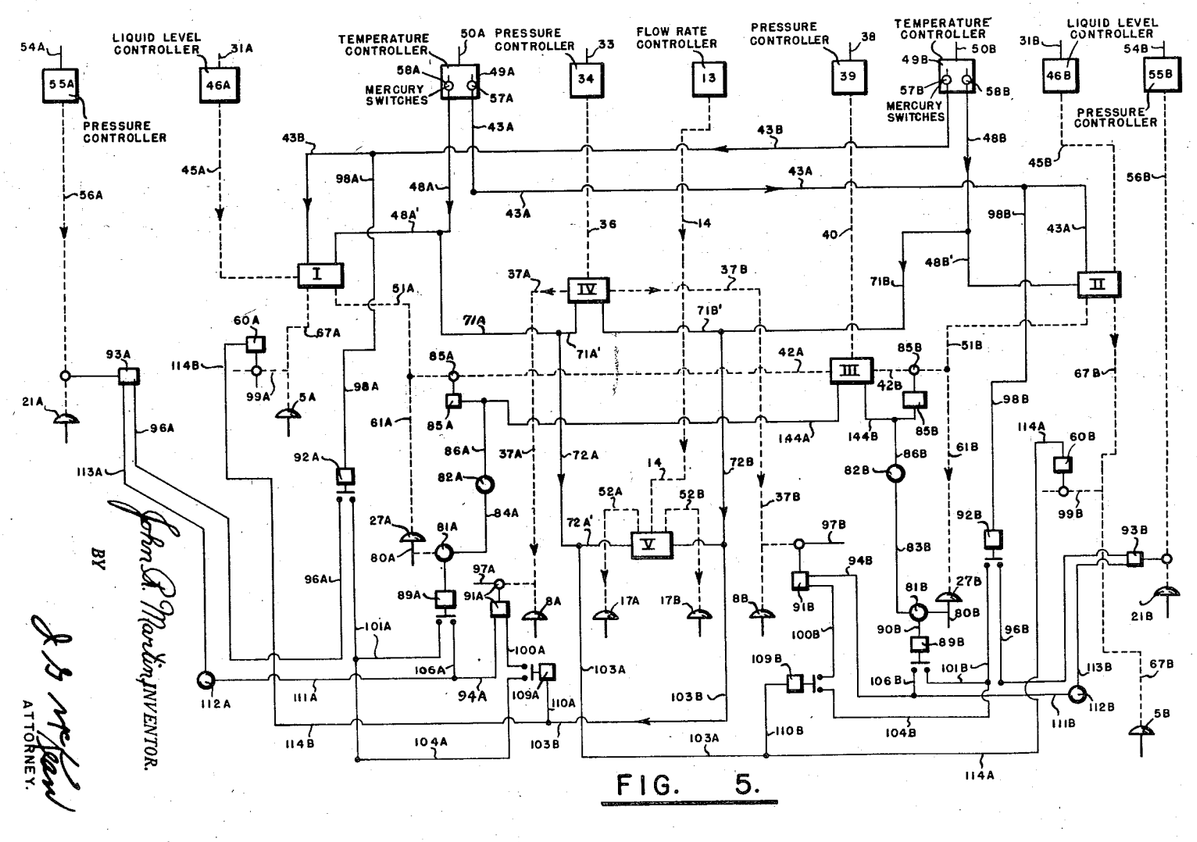

Turning now to Fig. 5, the inter-relation of the various instruments and their functions in controlling the cycle operation of chillers A and B will be described in more detail. The various control instruments are shown at the top and the pneumatically positioned control valves are shown in the lower portion of the figure. Electrical connections are shown as solid lines, and air lines are dotted. Temperature controllers 49A and 49B may each be equipped with two switches 57A and 58A and 57B and 58B, respectively, the switches conveniently being conventional mercury switches. Each mercury switch may be connected to a supply of A. C. voltage, not shown. The mercury switches are explosion proof and usually comprise a small housing containing two closely placed contacts and a pool of mercury. The housing may be tilted by a suitable means either to cause the pool of mercury to surround the contacts and close the circuit or to cause the mercury to move away from the contacts and break the circuit. Each switch is actuated by an index mechanism such that its housing will tilt and cause the circuit to close when the proper temperature level has occurred in either chiller. Switches 57A and 57B are actuated by the index mechanism when a first low temperature level is reached in the solution being chilled in either chiller. Switches 58A and 58B are actuated by the index mechanism when the solutions in either chiller have reached the ultimate low temperature level.

Switch 57A has one contact electrically connected through lead 43A to relay device II and through line 98B to solenoid switch 92B. Mercury switch 58A is electrically connected through lines 48A and 48A' to relay device I, through lines 71A 71A' to relay device IV, through lines 72A and 72A' to relay device V, through lines 103A and 110B to solenoid switch 109B, and through line 114A to solenoid valve 60B. Switch 57B in temperature controller 49B is electrically connected through line 43B to relay device I and through line 98A to solenoid switch 92A. Mercury switch 58B in temperature controller 49B is electrically connected to relay devices II, IV, and V, solenoid switch 109A, and solenoid valve 60A through lines equivalent to those previously described in connection with switch 58A.

Liquid level controllers 46A and 46B have air lines 45A and 45B leading to relay devices I and II, respectively, and flow rate controller 13 is connected through air line 14 to relay device V. Pressure controllers 34 and 39 have air lines 36 and 40 leading to relay devices IV and III, respectively, and pressure controllers 55A and 55B are connected through air lines 56A and 56B, respectively, to valves 21A and 21B. Relay devices I and II are connected through air lines 67A and 67B, respectively, to valves 5A and 5B and through lines 51A and 61A to valve 27A and through lines 51B and 61B to valve 27B, respectively. Relay device IV is connected through lines 37A and 37B to air close valves 8A and 8B, respectively. Relay device V has air lines 52A and 52B leading to valves 17A and 17B, respectively.

Relay device III is connected through lines 42A and 42B to lines 51A and 51B, respectively, leading to valves 27A and 27B. Line 42A contains solenoid valve 85A electrically connected through line 144A to relay device III and through line 86A to time delay device 82A which in turn is electrically connected through 84A to ratchet switch 81A. This ratchet switch is controlled by the movement of valve stem 88A on valve 27A such that on one closing of valve 27A, an electric impulse is relayed to time delay device 82A and on the next closing of valve 27A, a signal is impulsed through switch 81A to solenoid switch 89A.

Line 42B connected to relay device III also contains a solenoid valve 85B which is electrically connected through a time delay device 82B and ratchet switch 81B to stem 88B of valve 27B.

Line 56A leading from pressure controller 55A contains solenoid valve unit 93A which has one electric connection 113A leading to time delay device 112A. The time delay device is connected through line 111A to lead 106A which comprises one contact of solenoid switch 89A. Lead 96A from valve 93A comprises one contact of solenoid switch 92A and lead 101A comprises two contacts, one for solenoid switch 92A and the other for solenoid switch 89A. Lead 101A is also connected to lead 104A which is one contact for solenoid switch 109A. Lead 94A connecting to lead 111A is also connected to solenoid valve 91A, and another lead, 100A, is connected from solenoid valve 91A to a contact for solenoid switch 109A. The circuit is identical for solenoid valves 91B, 60B, and 93B and for solenoid switches 109B, 89B, and 92B.

It will now be assumed that the operation of chillers A and B is at the point C shown on Fig. 2; that is, only valves 8B and 17A are open. Chiller A is empty and ready to receive a charge of mixture to be chilled, and chiller B contains liquid which is being chilled to a temperature approaching a first low level at a predetermined temperature above the second or ultimate low temperature level. When the first low temperature level is reached in chiller B, mercury switch 57B is actuated such that its circuit is closed and an electric impulse is conveyed to relay device I and solenoid switch 92A. Valve 5A is caused to open by the procedure described in connection with Fig. 3 and fresh solution flows into chiller A. It is mentioned that bleed valve 60A of the type controlled by a solenoid unit is closed such that control air may not pass to the atmosphere through line 99A. It is also mentioned that the first low temperature level is selected such that a desired amount of liquid will flow into chiller A by the time the ultimate low temperature has been reached in chiller B. The index set in liquid level controller 46A is set such that its control air will shut off at the time the proper liquid level is reached in chiller A causing valve 5A to close. At about the same time valve 5A closes, the ultimate temperature is reached in chiller B which causes mercury switch 58B to close by its index mechanism. Electric signals are immediately relayed to relay devices II, IV, and V and to solenoid switch 109A and solenoid valve 60A. The impulse causes bleed valve 60A to open which is desirable as a safety precaution in some cases in which the subsequent opening of valve 8A will cause the liquid level in chiller A to drop momentarily because of the rapid evaporation of the diluent from the liquid therein. The sudden lowering of the liquid level in chiller A will cause controller 46A to function and send out control air which will in turn cause valve 5A to open and introduce additional charge into the chiller. Since it is not desired to charge more solution to chiller A after the proper level has once been reached, by opening valve 60A in response to the action of mercury switch 58B in temperature controller 49B, any air entering line 67A as a result of the functioning of liquid level controller 46A will not actuate valve 5A but will pass through line 99A to the atmosphere.

The impulse sent from mercury switch 58B to relay device V, when the ultimate temperature is reached in chiller B, causes valve 17B to close and valve 17A to open as described in connection with Fig. 4. This action transfers the flow of cold liquid diluent from chiller B to chiller A. Simultaneously, the signal reaches relay device IV to function the control of valve 8A from pressure controller 34. Solenoid bleed valve 91A which has been closed in a previous operation prevents control air reaching valve 8A from passing to the atmosphere through line 97A. As previously mentioned, the control air passing from line 37A to valve 8A preferably operates a hydraulic valve which throttles during the initial evaporation of diluent from chiller A. Since valve 8A is of the air close type, air pressure in line 37A will initially be at a high pressure, such as 10 p. s. i. g., to cause valve 8A to throttle. As the air pressure from controller 34 is decreased due to changes of pressure in trap 10 (Fig. 1), valve 8A will be opened to a greater extent gradually until at zero p. s. i. g. it will be completely open. It is mentioned that valve 8B remains open after the direction of flow of control air is changed from line 37B to 37A because the air pressure in line 37B at this point is zero p. s. i. g. In addition, valve 8B remains open because high air pressure from line 97B does not enter line 37B causing valve 8B to close until solenoid valve 91B is opened in a subsequent step. It is thus seen that chillers A and B are in fluid communication with one another when both valves 8A and 8B are open.

The signal coming from mercury switch 58B also actuates relay device II causing valve 27B to open. In other words, valve 27B is thrown on control from liquid level controller 46B. It will be desirable for liquid level controller 46B to have an index set adjusted such that the air pressure supplied to actuate the pneumatic valve controlling the supply of air pressure to valve 27B will be such that this air pressure will decrease as the liquid level in chiller B drops. Therefore, when the liquid level in chiller B has reached about 10 to 20% of its original level, the air from liquid level controller 46B will drop to a pressure insufficient to keep valve 78B (equivalent of valve 78A shown in Fig. 3) open. When valve 78B closes, valve 27B will close momentarily for a period of time sufficient to allow the contents of the chiller to drain down the walls. The impulse from mercury switch 58B also causes solenoid switch 109A to function and close the circuit between leads 100A and 104A such that solenoid valve 91A may be opened in a subsequent operation.

When valve 27B closes as described above after the liquid level in chiller B has reached a predetermined point, ratchet switch 81B closes a circuit to time delay device 82B. After a short drainage period in chiller B, for example about one minute, a signal is relayed through line 86B to relay device III and solenoid valve 85B, causing the latter valve to open. This action throws valve 27B on control from pressure controller 39 which sends control air through line 42B and open valve 85B through line 61B causing valve 27B to open. The remainder of the fluid in chiller B is then forced into tank 29 (Fig. 1). It is thus seen that the flow of the second portion of fluid from chiller B is controlled in delayed response to changes in liquid level occurring when the first portion of liquid is discharged from chiller B.

When all of the solution has been forced from chiller B into tank 29, the pressure in the latter tank will reach a predetermined value which will indicate that chiller B is empty. The index set in pressure controller 39 will, therefore, cause the flow of control air through lines 40 and 42B to discontinue and valve 27B will close a second time. At this second closing of valve 27B, ratchet switch 81B will send a signal to solenoid switch 89B which closes the circuit between leads 106B and 101B. At this particular time, solenoid switch 92B is closed; at the same time the circuit is closed leading through line 104B to solenoid switch 109B. Switch 109B was previously connecting lines 104B and 100B. By the action of ratchet switch 81B causing solenoid switch 89B to close its circuit, the circuit to solenoid valve 91B is completed causing this valve to open and permit air under pressure to pass from line 97B into line 37B and close air close valve 8B. Valve 8B thus closes at substantially the same time that valve 27B closes the second time and results in the fluid disconnection of chillers A and B.

The closing of the circuit at solenoid switch 89B also sends a signal to time delay device 112B which connects to solenoid valve 93B as previously described. Since switch 92B is also closed from a previous operation, the circuit is completed to solenoid valve 93B which causes its valve to open and permit pressure controller 55B to send its control air to valve 21B opening this latter valve. Warm gaseous diluent is then passed into chiller B for the warming up operation.

As chiller B warms up, the temperature in the chiller will eventually reach a point at which the circuits in mercury switches 57B and 58B (temperature controller 49B) will open, and the electric signals sent from these switches to the various portions of the circuit will cease. Solenoid switch 92A will close so that a signal may be passed from lead 101A to lead 96A at a subsequent step in the chilling cycle on chiller A. Solenoid valve 60A and solenoid switch 109A are also closed when mercury switch 58B is de-energized such that valve 5A may be made to function in a subsequent cycle and so that valve 91A can later open to permit air under pressure to pass from line 97A into line 37A and close air close valve 8A. Although solenoid valve 60A, which has been previously open, is closed at this point in the cycle, there is no danger of the liquid level in chiller A falling suddenly and causing control air from liquid level controller 46A to impulse the opening of valve 5A. This is because the critical period of the chilling operation in chiller A has been passed.

When sufficient warm, gaseous diluent has been passed into chiller B so as to heat this chiller to the desired temperature, the pressure in chiller B will reach a point at which pressure controller 55B through its index set will cease to send control air to valve 21B. The flow of hot, gaseous diluent to chiller B is thus discontinued.

When the temperature of the solution in chiller A has reached a first low level, mercury switch 57A closes its circuit which in turn impulses relay device II and solenoid switch 92B. Solenoid switch 92B opens its circuit between leads 101B and 96B which in turn breaks the circuit to solenoid valve 93B causing this valve to close. Therefore, any subsequent pressure changes in chiller B during the chilling step will not cause controller 55B to function and open valve 21B permitting warm, gaseous diluent to enter chiller B at an incorrect stage of the chilling cycle.

Time delay device 112B may be set such that it will carry a signal from solenoid switch 89B until about the same time that the circuit in solenoid switch 92B is opened as previously described. It will, therefore, not relay another signal to solenoid valve 93B until switch 89B is again functioned in a subsequent chilling cycle. Time delay device 112B may be utilized as a safety measure in conjunction with solenoid switch 92B. Under some conditions, however, it may not be desirable to utilize both of these devices to prevent valve 93B from opening at the incorrect time in the chilling cycle.

A signal impulsed from mercury switch 57A to relay device II functions as previously described to cause valve 5B to open and allow fresh solution to enter chiller B. When the ultimate low temperature is reached in chiller A, mercury switch 58A closes its circuit and signals are sent to the various portions of the unit. For example, solenoid switch 109B opens the circuit between lines 100B and 104B closing valve 91B which shuts off the flow of air under pressure to air close valve 8B. This valve is then ready to be controlled by control air from pressure controller 34. Bleed valve 60B is also opened at this point in the cycle which prevents valve 5B from opening due to changes in liquid level in chiller B. The subsequent operations in chiller B then follow in the manner previously described in connection with chiller A.

Briefly, the instrumentation described in Fig. 5 accomplishes the various functions as follows. A first temperature change occurring in the liquid being chilled in chiller B relays a signal which puts valve 5A on liquid level control from controller 46A which in turn stops the flow of liquid mixture to chiller A at a desired point. When the ultimate temperature has been reached by the solution in chiller B, an impulse is relayed such that valve 8A is put on pressure control from controller 34, valve 17A is put on flow rate control from controller 13, while simultaneously valve 17B is closed, and valve 27B is put on liquid level control from controller 46B. This action in effect causes chillers A and B to be fluidly connected since valve 8B remains open. After a first portion of mixture has been forced from chiller B, controller 46B will function valve 27B to close which in turn through a delayed response means impulses to cause valve 27B to be put on pressure control from controller 39 and valve 27B is reopened to allow a second portion of chilled mixture to be discharged from chiller B. A pressure change occurring in accumulator 29 will cause controller 39 to function the closing of valve 27B which in turn causes valve 8B to close, fluidly disconnecting chillers A and B, and to put valve 21B on pressure control from controller 55B.

In effect, controller 39 impulses the closing of valve 27B the second time and the closing of valve 8B and the opening of valve 21B through the time delay and switching device as described. When chiller B has been heated to a desired temperature by hot, gaseous diluent flowing through open valve 21B, a pressure change in chiller B will cause controller 55B to function the closing of valve 21B. If desired, the closing of valve 21B may be accomplished by a signal received when the temperature of solution in chiller A reaches a first low level. Either procedure will accomplish the discontinuance of flow of gaseous diluent to chiller B. The first temperature change occurring in solution being chilled in chiller B will also put valve 5B on liquid level control from controller 46B in order to charge fresh solution to this chiller. It is seen that liquid level controller 46B accomplishes through two index sets the control of the charge of fresh solution to the chiller and also the discharge of a first portion of solution from the chiller.

Obviously, if it is not desired to discharge solution from either chiller in two portions, controllers 46A or 46B may be set such that either discharge valves 27A or 27B will be closed when the liquid level in either chiller has reached a point indicating that the chillers are empty. Also, if the discharge operation is accomplished in only one step, level controllers 46A and 46B may impulse the opening of valves 27A and 27B and pressure controllers 39 may be arranged to impulse the closing of these valves when a pressure change occurring in accumulator 29 indicates that either chiller is empty. Suitable arrangements may also be made to cause an impulse from the liquid level controllers to cause valve 8B to close and valve 21B to open when either chiller has been discharged of its chilled solution. Obviously, there are many modifications of the present invention that may be applied depending on the type of control desired.

While I have presented a complete description of the instrumentation required to accomplish the sequence of steps described in connection with Fig. 2, it is realized that in some chilling operations this exact sequence of operations will not necessarily be followed. In some cases, it may not be desirable to charge liquid diluent to the chilling zone while gaseous diluent is being evaporated from the material being chilled. Also, it may not be desirable in some cases to preheat the empty chiller with warm gaseous diluent prior to charging the chiller with fresh solution. It may also be desirable to discharge the chiller of its chilled solution in only one step instead of employing two operations as I have described them. In such cases, much of the instrumentation may be deleted or simplified in order to accomplish the particular sequence of steps desired.

As previously mentioned, the throttling of gaseous diluent from the solution under pressure in a chilling zone to the precompression zone, such as trap 10, is perhaps the most critical operation encountered in the chilling cycle. It may be desired in some cases to supply control means for only the throttling valves and operate the remainder of the equipment by conventional procedures. By providing suitable instrumentation to accomplish automatic throttling of valves 8A and 8B, considerable savings in time may be realized as compared to the conventional operation in which the throttling is accomplished manually in accordance with the sound of the throttling action. Automatic throttling of these valves with manual operation of the remainder of the equipment, may be obtained by employing a pressure controller 34 with its index set and temperature controllers for each chiller provided with only one index set such that the mercury switches therein may close their respective circuits when the ultimate chilling temperature is reached in either chiller. Relay device IV such as that described hereinbefore also may be used to cause the signal from a mercury switch in one temperature controller to function the operation of the throttling valve on another chiller from controller 34. As previously mentioned, the throttling valves may be of the air close type such that controller 34 will supply air under relatively high pressure to cause the valve to throttle during the initial portion of the chilling operation and automatically decrease the control air pressure as it is desired to open the throttling valve to a greater extent during the subsequent portions of the chilling cycle. In other words, the throttling valves may be closed when 14 pounds per square inch air pressure is imposed on their diaphragms and may be completely open when no air pressure is imposed thereon. Under some conditions, air open type throttling valves may be preferred.

It would be desirable to utilize valves 97A and 97B to impose air under pressure on throttling valves 8A and 8B (of the air close type) when it is desired that one of these valves be closed. Valves 97A and 97B may be bleed valves if valves 8A and 8B are of the air open type. The operation of these valves may be functioned by signals received when valves 27A or 27B are closed after one of the chillers has completely emptied of its charge. This operation will be particularly suitable if the two chillers must be fluidly connected through valves 8A and 8B when chilled mixture is being discharged from either one of the chillers.

Also, if desired, the instrumentation may be modified such that a first temperature change in one of the chillers will impulse, through a suitable index set, the control of the charge of fresh solution to an empty chiller following which the ultimate temperature change will impulse the throttling action such that diluent may be evaporated from this fresh charge in the chiller. This may be done while the remainder of the operations are controlled manually.

One of the advantages of my invention is that the temperature changes occurring in one chilling zone may be used to activate one or more operations in another chilling zone depending on the extent to which automatic control is desired. Another advantage is that the control points in the various control instruments may be adjusted for many different types of liquids to be chilled or may be readjusted during a chilling operation on any one particular type of liquid undergoing chilling and yet retain the automatic features of my control process.

In order to simplify the description of the instrumentation shown in Fig. 5, complete electrical circuits have not been included in all cases. Such circuits and a large part of the other equipment shown are conventional to the art and a complete discussion of their operation is not within the scope of this invention. The mercury switches and solenoid valve and switching arrangements may be of the types conventionally available, and such units may be operated by either A. C. or D. C. supplies. It is obvious to one skilled in the art that the particular combination of the instruments and connections shown is only one of the many combinations that may be used. All of the instruments may be either of the electrical or pneumatic type or may be combinations of these types such as is shown in Fig. 5.

I have shown only one method of relaying signals from one chilling cycle to accomplish control of operation in another chilling cycle. I do not intend however to be restricted to equipment arrangements for carrying out my invention. It is also obvious that many types of valves can be employed in conjunction with the equipment I have illustrated.

I will now discuss my invention in connection with the control of the sequence of chilling operations carried out in two chilling zones for crystallizing wax from a lubricating oil distillate diluted with propane. The lubricating oil distillate may be of the type derived from a Panhandle crude and may contain waxy materials in quantities as high as about 20%. Such distillates usually require chilling to approximately −50° F. in order to obtain a finished lubricating oil having a low pour point. Also such distillates upon "shock" chilling often form wax crystals which are difficult to filter. In this operation, therefore, the liquid solution of propane and oil distillate, having a ratio of about 3 to 1, charged to tank 2 will be at a temperature somewhat above 100° F., and chilling zone A, which is empty in this particular illustration, will have been heated to a temperature of about 30° F. by warm propane gas in a previous operation to prevent the harmful effect of "shock" chilling.

The chilling zones employed, A and B, may be conventional horizontal drums having a diameter of 11 feet and in the particular operation at hand, it will be assumed that each drum will be partially filled to a level of seven feet with liquid solution prior to the chilling operation. It will be assumed that chiller B contains solution undergoing chilling and that both valves 8B and 17B are open. It will also be assumed that the material is to be chilled to −45° F. and that the charging operation to chiller A should begin at the time the temperature of the mixture in chiller B has been chilled to −25° F. in order that chiller A will have a seven feet level of mixture by the time the contents of chiller B have reached the low ultimate temperature (−45° F.).

Therefore, both temperature controllers 49A and 49B will have two index sets controlling two mercury switches, one index set causing one mercury switch to close its circuit when the chilling mixture temperature changes from a temperature slightly above −25° F. to about −25° F. and the other mercury switch will close its circuit when the solution temperature changes from a temperature slightly above −45° F. to this temperature.

When the mixture in chiller B makes the first temperature change, mercury switch 57B will send a signal through relay device I as previously described and cause liquid level controller 46A to operate. Valve 5A opens and warm solution flows into the chiller until the liquid level has reached seven feet at which time the index set in the liquid level controller will automatically cut off air pressure and close valve 5A. When chiller A is charged, it is at its maximum pressure at approximately the same time the ultimate chilling temperature is reached in chiller B. The second temperature change thus occurring in chiller B causes mercury switch 58B to function and signal flow rate controller 13 to open valve 17A and close valve 17B, pressure controller 34 to start the throttling action on valve 8A and flow rate controller 46B to open valve 27B. The evaporation of propane from the mixture in chiller A is thus initiated and at the same time cold liquid propane is added back to this chiller to maintain the liquid level at the desired point. An index set on controller 13 will be adjusted to supply the required amount of cold liquid propane added to chiller A. An index set on pressure controller 34 will be mechanically adjusted to control the extent to which valve 8A is throttled. Since the liquid level in chiller A will drop momentarily during the initial portion of the chilling operation because of the rapid evaporation of diluent from the mixture, mercury switch 58B will also signal the opening of bleed valve 60A to prevent liquid level controller 46A from opening valve 5A. It is mentioned that the pressure of mixture initially charged to chiller A is at approximately 200 pounds per square inch and the pressure in compressor suction trap 10 is substantially zero pounds per square inch gauge.

The pressure of liquid in chiller B which has reached its second or ultimate low temperature is at approximately zero pounds per square inch gauge; hence, when valve 8A is throttled with valve 8B remaining open, chillers A and B are fluidly connected and chilled solution is forced from chiller B through open valve 27B and line 28 to tank 29. When the liquid level in chiller B has reached about one foot, an index set on level controller 46B will stop the flow of control air to valve 27B and cause this valve to close momentarily. This closing operation will function the time delay device previously described and after a fixed time, such as one minute, the operation of valve 27B is thrown on pressure control from controller 39. Controller 39 then functions to open valve 27B to allow the remainder of the fluid in chiller B to be charged to tank 29. An index set on controller 39 is set to close valve 27B when the pressure in tank 29 exceeds about 3 pounds per square inch gauge. When this pressure is reached, valve 27B is closed which in turn impulses the closing of valve 8B through the switching device previously described. Simultaneously, the switching device functions to open valve 93B and puts the flow of hot propane gas into chiller B on pressure control from controller 55B. Valve 21B is opened and the hot gas will flow into chiller B causing it to warm up. As chiller B warms up, its pressure will increase and an index set in controller 55B will be adjusted to cause valve 21B to close when the pressure in chiller B has reached approximately 100 pounds per square inch gauge. Shortly thereafter, a first temperature change at about −25° F. will have occurred in the solution in chiller A and its temperature control will in turn cause liquid level controller 46B to function the opening of valve 5B, and fresh propane-oil solution is charged into chiller B. The cycle for chiller B is then repeated by the same sequence of operations described for chiller A.

If more than two chilling zones are to be controlled in accordance with my invention, the operations described above would apply. For example, in the case of three zones, a first temperature change occurring in mixture being chilled in a first zone would impulse the charging of a second zone which would in turn impulse the charging of a third zone when its mixture reached a first temperature level. When a first temperature change occurred in mixture in the third zone, an impulse would initiate the recharging of the first zone and so on. Various modifications may be applied to obtain the desired control of any particular step or steps in the operation of a plurality of chilling zones.

It is mentioned that the chilled solution charged to filter feed tank 29 is discharged through line 30 to a suitable filtering means after the charge has been received from one of the chillers. Although a pressure controller has been mentioned in connection with the operation of valves 27A and 27B and of 8A and 8B, flow rate controllers could be utilized to accomplish the desired results.

If it is desired to chill a mixture of propane and deasphalted residuum containing waxy material, it is usually not necessary to charge the solution to a chiller at as high a temperature as is used in the case of an oil distillate. This is because the waxy materials in a residuum are usually not deleteriously effected by "shock" chilling. Obviously, the chillers should not be warmed up with hot propane gas to any higher temperature than is absolutely necessary in order to save compressor capacity. On the other hand, the solution in tank 2 should be at a sufficiently high temperature such that its pressure will cause the solution to force itself into the empty chiller at the desired rate.

It is readily seen that the control of a chilling operation in accordance with my invention depends to a large extent on correlating the various steps in the chilling operation depending on the type of stock being treated. Once the chilling characteristics of a particular oil are known, the proper adjustment of the index sets may be made on the various control instruments in order to obtain the control hereinbefore described. If changes in compressor capacity or filter feed rate occur, or if plugging of various lines with waxy material occurs during the operation, the index control points on the various instruments may be quickly adjusted in order to compensate for such changes. I have included in the description of this invention some of the safety features required to prevent control instruments from functioning at a sequence in the chilling operation other than those desired. It is obvious that other types of interlocking devices may be used to insure safe operation of the chilling zones at all times.

While I have specifically described my invention in connection with the dewaxing of hydrocarbon oils in the presence of propane, it is obvious that the principle I have described is applicable to chilling many types of materials which are admixed with a volatile diluent. Hydrocarbons having from 2 to 5 or 6 carbon atoms may be employed as diluent under the proper conditions. Other volatile diluents which are soluble in the material to be chilled may be employed. Such diluents may be sulfur dioxide, the low molecular weight alcohols and ketones, carbon tetrachloride, and carbon disulfide. Other volatile diluents may be desired in some cases. The selection of the diluent will depend to a large extent on its solubility characteristics, it boiling point, and the ease with which it can be handled in compressors and other types of equipment. My invention is not restricted to the chilling of lubricating oil-containing hydrocarbons. For example, it may be desired to chill lower molecular weight hydrocarbons to effect some desired results. Naphtha containing a crystallizable material such as naphthalene may be treated in accordance with my invention. Accordingly, I do not intend to be restricted to any specific type of material to be chilled or diluent to be employed as an auto-refrigerant.

Having fully described and illustrated the nature and objects of the present invention, what I wish to claim as new and useful and to secure by Letters Patent is:

1. In the method of chilling a liquid mixture comprising a normally liquid mixture and a volatile diluent in a plurality of chilling zones in cycle operation in which each chilling cycle includes the steps of charging said mixture at high pressure to a chilling zone, chilling said mixture to a predetermined low temperature by evaporating diluent therefrom to a low pressure zone while charging liquid diluent to said mixture, discharging chilled mixture from said chilling zone to an accumulation zone, and in which, in any two of said zones comprising first and second chilling zones, a portion of said liquid mixture is charged to a first chilling zone while chilling another portion of liquid mixture in a second chilling zone, the improvement which comprises the steps of automatically initiating the charge of liquid mixture to said first chilling zone when said liquid mixture in said second chilling zone reaches a first temperature substantially above said predetermined low temperature, charging said liquid mixture to said first zone at a rate responsive to changes in liquid level occurring in said first zone, automatically initiating the evaporation of diluent from said first zone and the discharge of chilled mixture from said second zone in response to the liquid mixture in said second zone reaching said predetermined low temperature, evaporating the diluent from said first zone at a rate responsive to changes in pressure occurring in said low pressure zone, the rate of evaporation being caused to increase in response to a decrease in pressure in the low pressure zone and being caused to decrease in response to an increase in pressure in the low pressure zone and automatically discharging said chilled mixture from said second zone to said accumulation zone at a rate responsive to a fall in liquid level occurring in said second zone.

2. A method in accordance with claim 1 in which said first and second zones are automatically fluidly connected in response to the liquid mixture in said second zone reaching said predetermined low temperature and are automatically fluidly disconnected in response to a rise in pressure occurring in said accumulation zone.

3. A method in accordance with claim 1 in which the charge of liquid diluent to said first zone is automatically initiated in response to the liquid mixture in said second zone reaching said predetermined low temperature.

JOHN R. MARTIN.

REFERENCES CITED

The following references are of record in the file of this patent:

UNITED STATES PATENTS

| Number | Name | Date |
|---|---|---|
| 1,977,055 | McGill et al. | Oct. 16, 1934 |
| 1,988,767 | Aldridge et al. | Jan. 22, 1935 |
| 1,988,768 | Aldridge | Jan. 22, 1935 |
| 2,031,118 | Merrill | Feb. 18, 1936 |
| 2,098,545 | Hopper et al. | Nov. 9, 1937 |
| 2,104,310 | Roelfsema | Jan. 4, 1938 |
| 2,122,019 | Adams et al. | June 28, 1938 |
| 2,143,872 | Forrest | Jan. 17, 1939 |
| 2,232,840 | Claffey | Feb. 25, 1941 |
| 2,303,721 | Brandt | Dec. 1, 1942 |

OTHER REFERENCES

Proctor et al.: "Refiner & Natural Gasoline Manufacturer"; vol. 15, pages 225–231, June 1936.